United States Patent
Souk

(10) Patent No.: US 11,130,224 B2
(45) Date of Patent: Sep. 28, 2021

(54) PARALLEL LINK ROBOT

(71) Applicant: FANUC CORPORATION, Yamanashi (JP)

(72) Inventor: Hyunchul Souk, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 94 days.

(21) Appl. No.: 16/704,213

(22) Filed: Dec. 5, 2019

(65) Prior Publication Data
US 2020/0206906 A1 Jul. 2, 2020

(30) Foreign Application Priority Data
Dec. 26, 2018 (JP) .............................. JP2018-242461

(51) Int. Cl.
*B25J 9/00* (2006.01)
*B25J 9/10* (2006.01)
*B25J 17/02* (2006.01)

(52) U.S. Cl.
CPC ............ *B25J 9/0072* (2013.01); *B25J 9/0051* (2013.01); *B25J 9/1065* (2013.01); *B25J 17/0266* (2013.01)

(58) Field of Classification Search
CPC ...... B25J 9/0051; B25J 9/0072; B25J 9/1065; B25J 17/0266
See application file for complete search history.

(56) References Cited

U.S. PATENT DOCUMENTS

| 6,397,485 B1 * | 6/2002 | McMurtry | B25J 17/0266 33/503 |
| 7,997,161 B2 * | 8/2011 | Chablat | B25J 17/0266 74/490.03 |
| 9,566,708 B2 * | 2/2017 | Kurnianto | B25J 9/02 |

(Continued)

FOREIGN PATENT DOCUMENTS

| CN | 107433574 A | 12/2017 |
| EP | 2 602 068 A1 | 6/2013 |

(Continued)

OTHER PUBLICATIONS

Japanese Office Action dated Apr. 6, 2021, in connection with corresponding JP Application No. 2018-242461 (7 pp., including machine-generated English translation).

(Continued)

*Primary Examiner* — Bobby Rushing, Jr.
(74) *Attorney, Agent, or Firm* — Maier & Maier, PLLC

(57) ABSTRACT

A parallel link robot includes: a base portion; a movable portion; link portions coupling the base and movable portions; and actuators attached to the base portion and driving the respective link portions. Each of the link portions includes drive links swung around axes by the respective actuators, and two each of the passive links parallel to each other and swingably arranged between the drive link and the each of the movable portions. The robot includes a drive unit disposed parallel to the two passive links of at least one of the link portions and between the passive links and drives a mechanical unit attached to the movable portion. The drive unit is attached to the drive link with a joint, swingably coupling the drive unit to the drive link around at least mutually intersecting axes, on a straight-line coupling swinging center points of the passive links and the drive link.

5 Claims, 7 Drawing Sheets

(56) References Cited

U.S. PATENT DOCUMENTS

| | | | |
|---|---|---|---|
| 2006/0241810 A1 | 10/2006 | Zhang et al. | |
| 2011/0097184 A1 | 4/2011 | Kinoshita et al. | |
| 2013/0142608 A1 | 6/2013 | Zhang et al. | |
| 2014/0083232 A1 | 3/2014 | Go | |
| 2016/0332296 A1 | 11/2016 | Kurnianto | |
| 2018/0340819 A1 | 11/2018 | Taira | |
| 2020/0147783 A1* | 5/2020 | Crawford | B25J 17/0275 |

FOREIGN PATENT DOCUMENTS

| | | | |
|---|---|---|---|
| JP | 2003-148582 | A | 5/2003 |
| JP | 4653848 | B | 3/2011 |
| JP | 2011-088262 | A | 5/2011 |
| JP | 2014-046406 | A | 3/2014 |
| JP | 2014-166675 | A | 9/2014 |
| JP | 2018-200225 | A | 12/2018 |
| WO | 2012/017722 | A1 | 2/2012 |

OTHER PUBLICATIONS

Japanese Search Report dated Mar. 29, 2021, in connection with corresponding JP Application No. 2018-242461 (22 pp., including machine-generated English translation).

* cited by examiner

PARALLEL LINK ROBOT

CROSS-REFERENCE TO RELATED APPLICATIONS

This application claims the benefit of Japanese Patent Application No. 2018-242461, the content of which is incorporated herein by reference.

FIELD

The present invention relates to a parallel link robot.

BACKGROUND

There is known a parallel link robot including a base portion, a movable portion, and three link portions coupling the base portion and the movable plate (e.g., see Japanese Patent No. 4653848).

A link portion of a parallel link robot of Japanese Patent No. 4653848 is made up of a drive link extending from the base portion and two passive links extending from the movable plate, and these links are coupled to each other by a spherical bearing.

An auxiliary link couples the two passive links via the bearing, and an additional actuator is attached to a shaft that extends from a central portion of the auxiliary link via the bearing. A power transmission mechanical unit extending from an output shaft of the additional actuator extends parallel to the two passive links and between these passive links. The power transmission mechanical unit is connected to a shaft portion, which extends from a posture change mechanical unit attached to the movable plate, via a universal joint.

SUMMARY

One aspect of the present invention is a parallel link robot provided with: a base portion; a movable portion; two or more link portions that couple the base portion and the movable portion; and two or more actuators that are attached to the base portion and drive the respective link portions. Each of the link portions includes a drive link that is swung around one axis by each of the actuators, and two passive links parallel to each other and swingably arranged between the drive link and the movable portion. The parallel link robot is provided with an additional drive unit that is disposed parallel to the two passive links of at least one of the link portions and between the passive links and drives an additional mechanical unit attached to the movable portion. The additional drive unit is attached to the drive link with a joint, swingably coupling the additional drive unit to the drive link around at least two mutually intersecting axes, on a straight line coupling the two passive links and a swing center point of the drive link.

DETAILED DESCRIPTION

A parallel link robot 1 according to an embodiment of the present invention will be described below with reference to the drawings.

Figure 1:
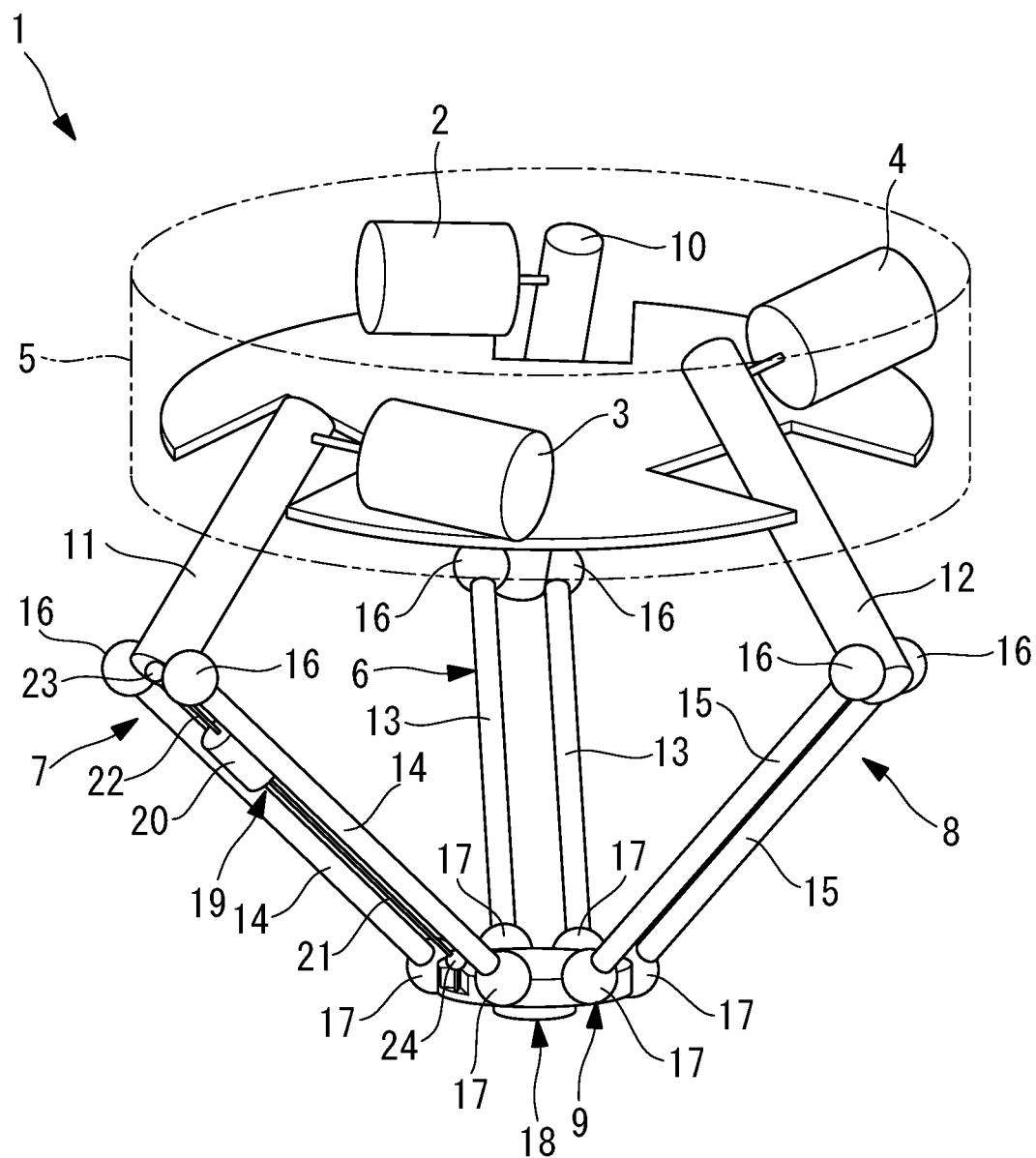
FIG. 1 is an overall configuration view showing a parallel link robot according to an embodiment of the present invention.

As shown in FIG. 1, the parallel link robot 1 according to the present embodiment is provided with: a base portion 5 to which a plurality of actuators, for example, three actuators 2, 3, 4, are attached; three link portions 6, 7, 8 respectively coupled to the actuators 2, 3, 4; and a movable portion 9 to which the tips of the respective link portions 6, 7, 8 are attached. The actuators 2, 3, 4 are, for example, motors and reducers, which are not shown.

The respective link portions 6, 7, 8 include drive links 10, 11, 12 driven by the actuators 2, 3, 4, and passive links 13, 14, 15 disposed in positions connecting the drive links 10, 11, 12 and the movable portion 9. Two each of the passive links 13, 14, 15 are provided for each of the drive links 10, 11, 12. Two each of the passive links 13, 14, 15 have a straight rod-like shape and are arranged parallel to each other. The connection between the drive links 10, 11, 12 and the passive links 13, 14, 15 and the connection between the passive links 13, 14, 15 and the movable portion 9 are made by spherical bearings 16, 17, respectively, to form joints.

Figure 2:
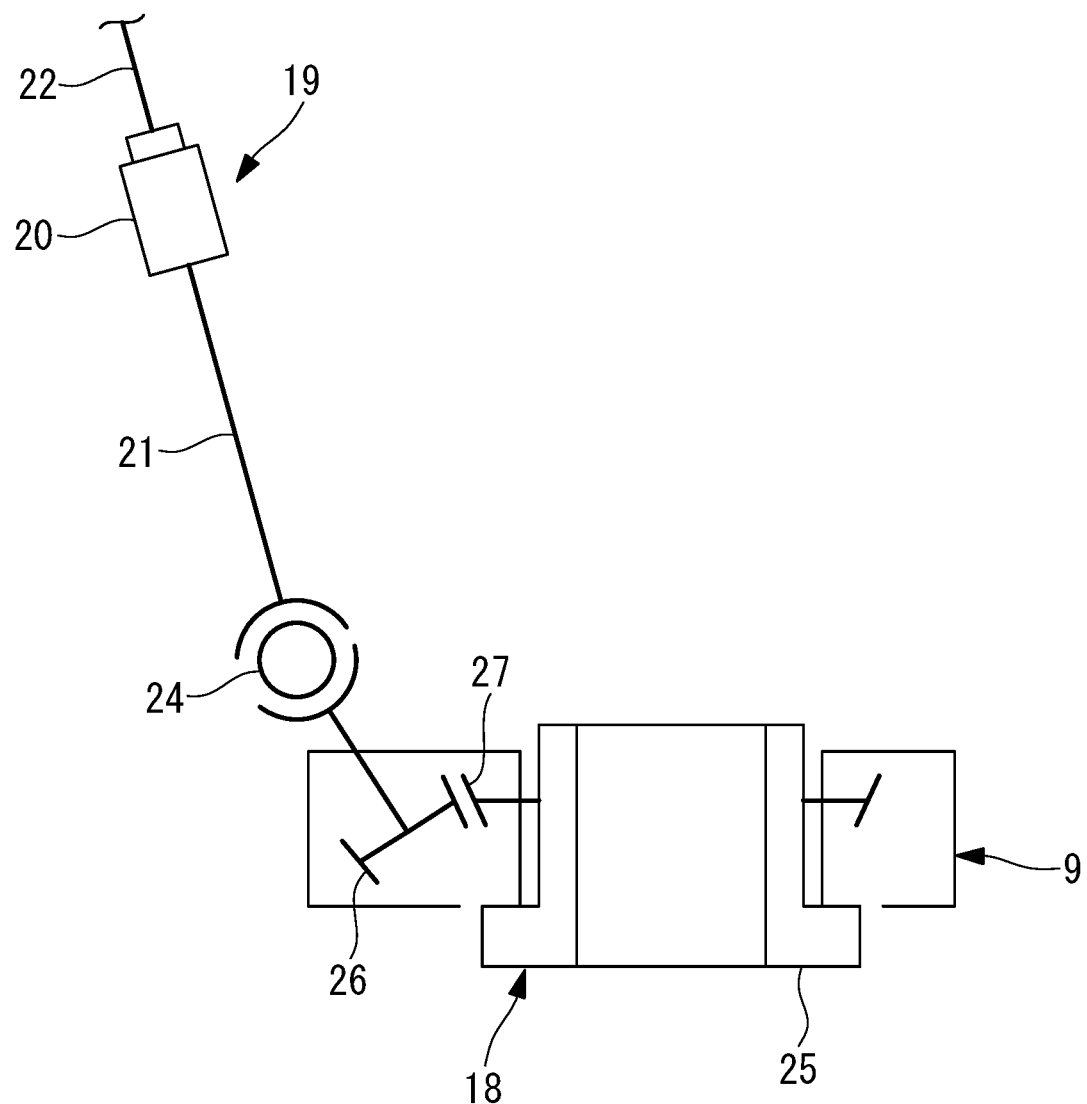
FIG. 2 is a schematic view showing an additional drive unit and a wrist mechanism provided in the parallel link robot of FIG. 1.
Figure 3:
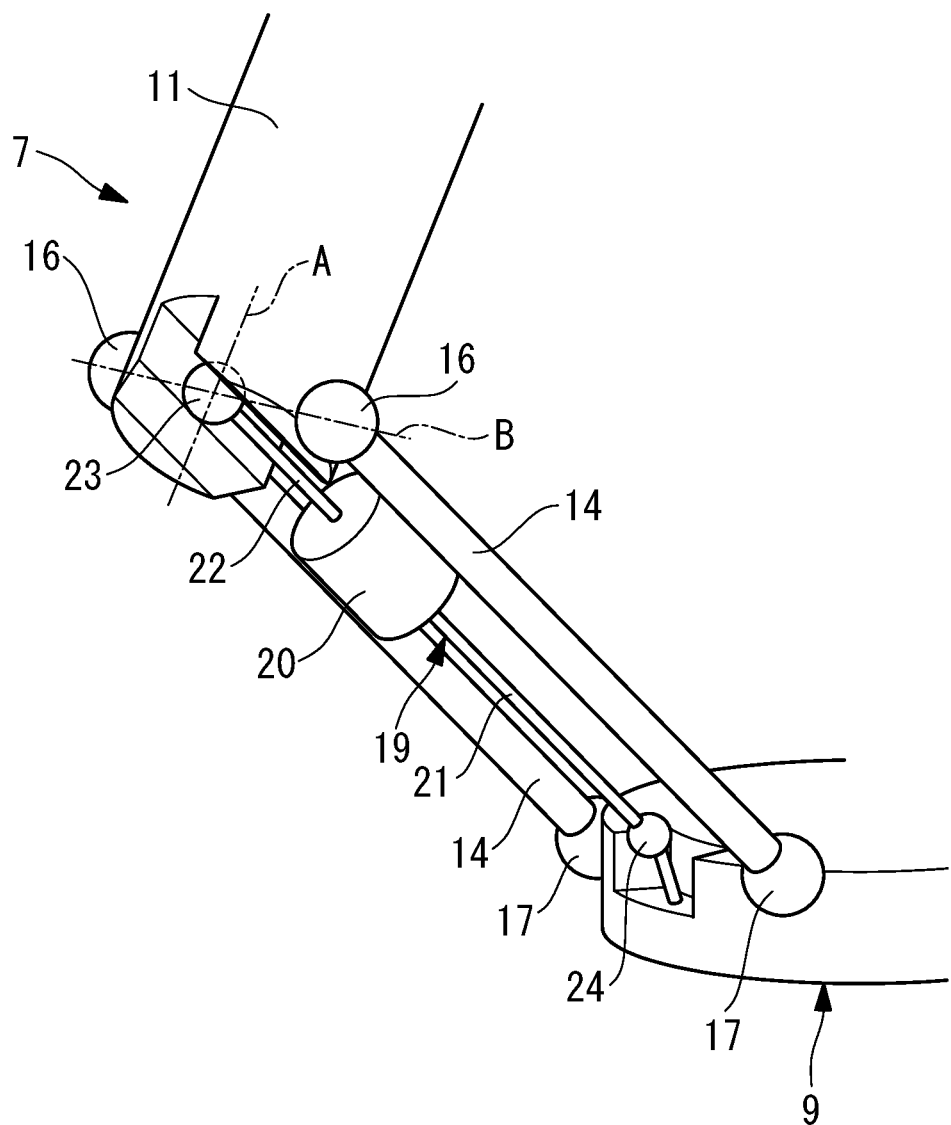
FIG. 3 is a view showing an example of a universal joint that couples a drive link and the additional drive unit in the parallel link robot of FIG. 1.

Further, as shown in FIG. 2, the parallel link robot 1 according to the present embodiment is provided with a uniaxial wrist mechanism (additional mechanical unit) 18 attached to the movable portion 9, and as shown in FIG. 3, an additional drive unit 19 for driving the wrist mechanism 18 is disposed between the two passive links 14 provided in one link portion 7. The additional drive unit 19 includes an additional actuator 20 and a drive shaft 21 that transmits a drive force to the wrist mechanism 18. The additional actuator 20 is, for example, a motor and a reducer, which are not shown.

The additional actuator 20 and the drive shaft 21 of the additional drive unit 19 are arranged in series along a single axis. The axis of the additional drive unit 19 is disposed parallel to and between the two passive links 14.

In the present embodiment, the additional drive unit 19 includes a rod-like attachment portion 22 extending along the axis from the actuator 20, and the attachment portion 22 is attached to the end of the drive link 11 with a universal joint (joint) 23. The drive shaft 21 of the additional drive unit 19 is connected to the wrist mechanism 18 by a spherical bearing 24.

Figure 4:
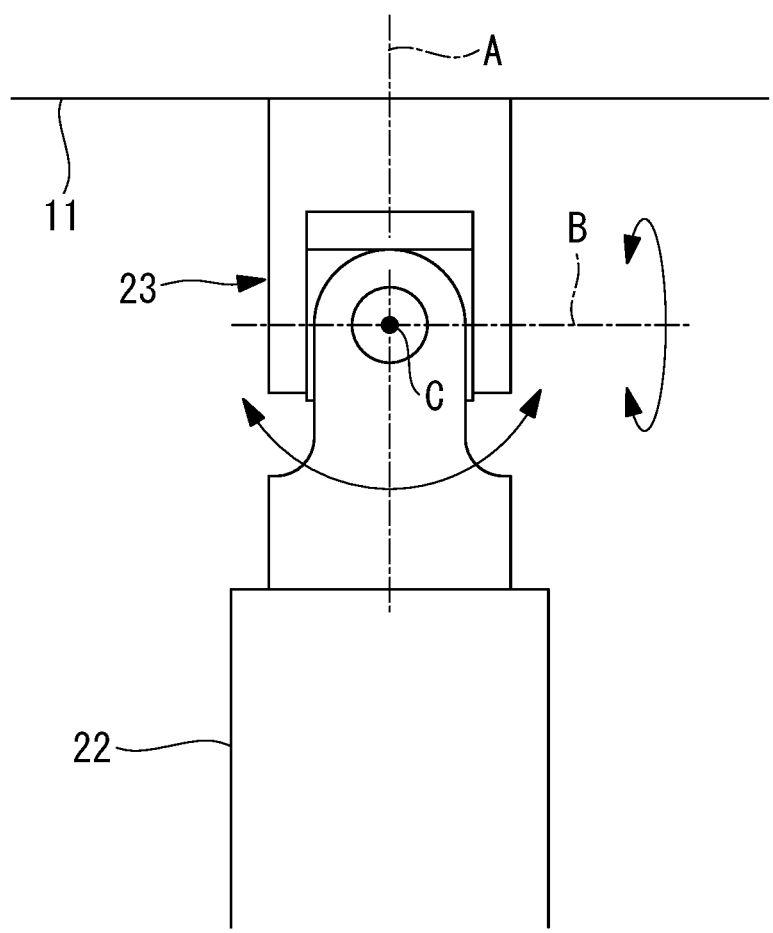
FIG. 4 is a schematic perspective view showing a link portion provided with the additional drive unit in the parallel link robot of FIG. 1.

More specifically, as shown in FIG. 4, the swing center point of the universal joint 23 is disposed at the central position of a line segment connecting the swing center points of the two spherical bearings 16 that swingably couple the two passive links 14 to the drive link 11. The swinging center point of the spherical bearing 24 for connecting the drive shaft 21 to the wrist mechanism 18 provided in the movable portion 9 is disposed at the central position of a line segment connecting the swinging center points of the two spherical bearings 17 that swingably couple the two passive links 14 to the movable portion 9.

As shown in FIG. 4, the universal joint 23 allows the swing of the attachment portion 22 with respect to the drive link 11 around a first axis (axis) B perpendicular to a longitudinal axis A of the drive link 11 and around a second axis (axis) C passing the intersection between the longitudinal axis A of the drive link 11 and the first axis B and perpendicular to the first axis B. The universal joint 23 locks the rotation of the attachment portion 22 around a third axis which is the longitudinal axis of the attachment portion 22.

The wrist mechanism 18 includes, for example as shown in FIG. 2, a wrist element 25 supported by the movable portion 9 rotatably around the vertical axis, and a pair of bevel gears 26, 27 that transmit the rotational force of the drive shaft 21 to the wrist element 25. The shaft portion of the drive-side bevel gear 26 is attached to the tip of the drive shaft 21 with the spherical bearing 24. The driven-side bevel gear 27 is fixed to the wrist element 25.

The action of the parallel link robot 1 according to the present embodiment configured in the above manner will be described below.

According to the parallel link robot 1 of the present embodiment, the three actuators 2, 3, 4 provided in the base portion 5 are operated individually, so that when the three drive links 10, 11, 12 are swung, two each of the passive links 13, 14, 15 respectively coupled to the drive links 10, 11, 12 swing with respect to the drive links 10, 11, 12. It is thereby possible to translate the movable portion 9 to any position in the three-dimensional direction.

Further, by operating the additional actuator 20 of the additional drive unit 19 provided in one link portion 7, power can be supplied to the wrist mechanism 18, attached to the movable portion 9, via the drive shaft 21. By the operation of the wrist mechanism 18, it is possible to change the posture of a tool, which is not shown, attached to the tip of the wrist element 25.

Figure 5:
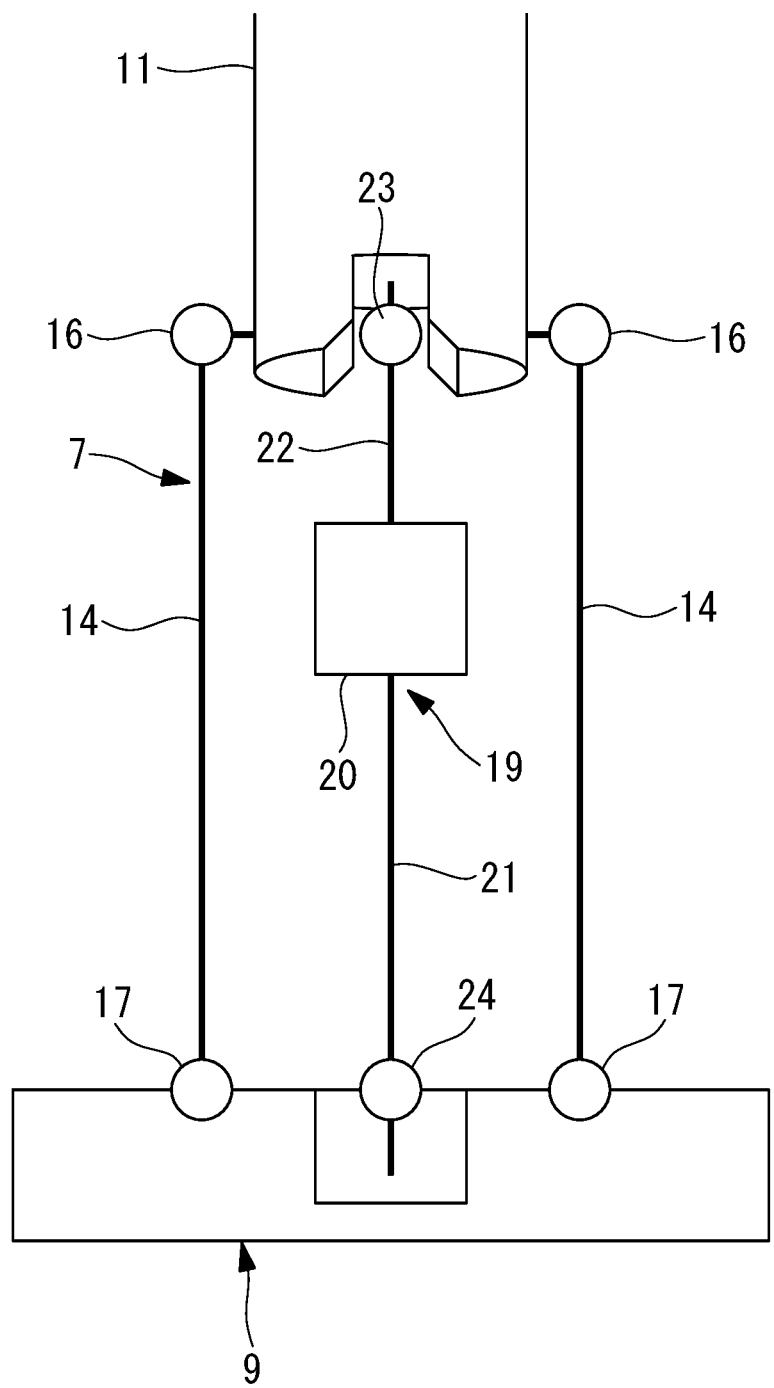
FIG. 5 is a schematic view showing the link portion and the additional drive unit of FIG. 4.
Figure 6:
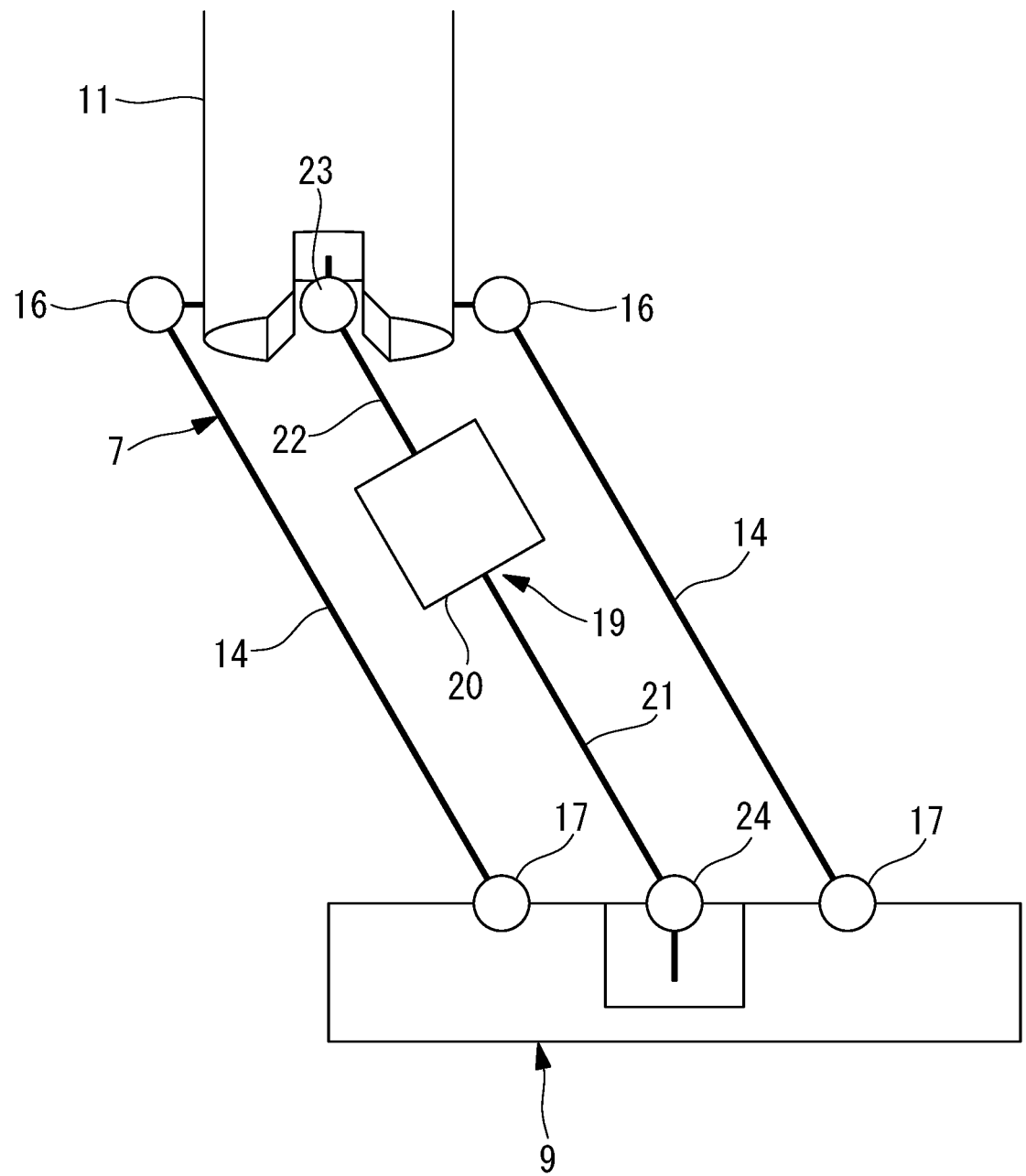
FIG. 6 is a schematic view showing a state where a passive link of the link portion of FIG. 5 has swung with respect to the drive link.

In this case, according to the parallel link robot 1 of the present embodiment, two each of the passive links 13, 14, 15 of the respective link portions 6, 7, 8 are connected to the drive links 10, 11, 12 and connected to the movable portion 9 by the spherical bearings 16, 17, respectively, and are thus always held parallel regardless of the positions and posture of the passive links 13, 14, 15, as shown in FIGS. 5 and 6.

Also, the attachment portion 22 at one end of the additional drive unit 19 is connected to the drive link 11 by the universal joint 23, and the drive shaft 21 at the other end is connected to the wrist mechanism 18 by the spherical bearing 17. Thus, as shown in FIGS. 5 and 6, the additional drive unit 19 moves with the movement of the passive link 14 and is held parallel to the passive link 14 regardless of the position and posture of the passive link 14.

With the additional drive unit 19 being coupled to the drive link 11 by the universal joint 23, an inertial force produced due to the movement of the additional drive unit 19 is supported by the drive link 11. The amount and speed of movement of the drive link 11 are smaller than those of the passive link 14, so that the drive link 11 can be configured to be larger in weight than the passive link 14 and can thus be configured to have higher rigidity than the passive link 14.

Therefore, according to the parallel link robot 1 of the present embodiment, the inertial force of the additional drive unit 19, which moves greatly at a high speed with the operation of the passive link 14, can be more reliably supported by the drive link 11 having high rigidity. Hence there is an advantage of preventing the inertial force of the additional drive unit 19 from acting on the passive link 14 to make the passive link 14 lightweight.

Further, as described above, the universal joint 23 allows the swing of the attachment portion 22 with respect to the drive link 11 around the first axis B and around the second axis C and locks the rotation of the attachment portion 22 around the longitudinal axis of the attachment portion 22. As a result, the universal joint 23 can lock the rotation of the additional drive unit 19 itself without provision of a special detent mechanism. Since no detent mechanism is provided, it is possible to form the parallel link robot 1 in a simple structure and make the parallel link robot 1 lightweight.

In the present embodiment, the case has been illustrated where the parallel link robot 1 includes the three link portions 6, 7, 8, but the present invention is not limited thereto but may be applied to a parallel link robot 1 including any number, more than one, of link portions. As the additional mechanical unit, any tool may be employed in addition to the wrist mechanism 18.

Further, the case has been illustrated where the additional drive unit 19 is provided in one link portion 7, but instead of this, a parallel link robot 1 having two or more additional drive units 19, or additional drive units 19 in the same number as the link portions 6, 7, 8, may be employed. It is thereby possible to drive the additional mechanical unit 18 with higher flexibility.

In the present embodiment, the additional drive unit 19 has been connected to the drive link 11 by the universal joint 23, but instead of this, the additional drive unit 19 may be connected by a spherical bearing (joint) 28. The spherical bearing 28 usually allows the rotation of the attachment portion 22 around the third axis perpendicular to the first axis B and the second axis C in addition to the swing of the attachment portion 22 around the first axis B and around the second axis C with respect to the drive link 11. Therefore, in this case, it is necessary to provide a detent mechanism 29 for the additional drive unit 19 around the third axis.

Figure 7:
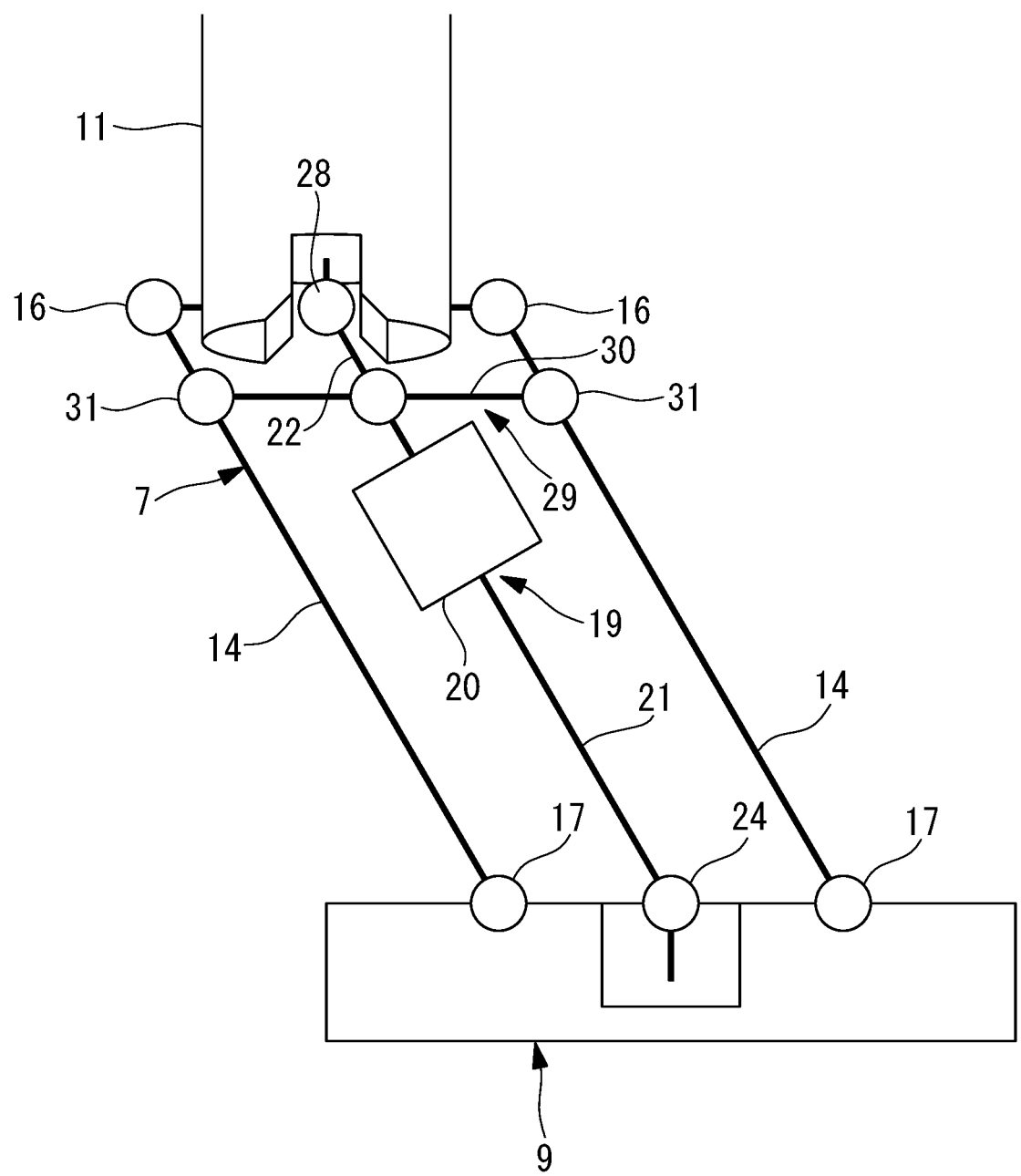
FIG. 7 is a schematic view showing a modification in a case where the universal joint of FIG. 5 has been changed to a spherical bearing.

As the detent mechanism 29, as shown in FIG. 7, it is possible to employ a mechanism formed by employing a rod-like auxiliary link 30, which is bridged between the two passive links 14 of the link portion 7 and swingably attached thereto with the bearings 31, and swingably attaching the attachment portion 22 to the auxiliary link 30 in its longitudinally middle position with the bearings 31. This restricts the rotation of the additional drive unit 19 around the third axis and enables the rotation of the motor to be correctly transmitted to the wrist mechanism 18 by the drive shaft 21 and the spherical bearing 24.

Since the two passive links 14 are coupled to each other by the auxiliary link 30, it is also possible to lock the rotation around the longitudinal axis of each passive link 14 itself.

Instead of this, the detent mechanism 29 for the passive link 14 itself may be provided separately from the detent mechanism for the additional drive unit 19

As the detent mechanism 29 for the additional drive unit 19, an auxiliary link 30, which is bridged between one of the passive links 14 and the attachment portion 22 and coupled by the bearing 31, may be employed.

In addition, a detent mechanism 29 of any other method may be employed.

In the present embodiment, it has been assumed that the swing center point of the universal joint 23 is disposed at the central position of the line segment connecting the swing center points of the two passive links 14 and the drive link 11, but instead of this, the swing center point of the universal joint 23 may be shifted from the center so long as being disposed on the above straight line.

The invention claimed is:

1. A parallel link robot comprising:
   a base portion;
   a movable portion;
   two or more link portions that couple the base portion and the movable portion; and
   two or more actuators that are attached to the base portion and drive respective link portions, wherein
   each of the link portions includes
      a drive link that is swung around one axis by each of the actuators, and
      two passive links parallel to each other and swingably arranged between the drive link and the movable portion,
   the parallel link robot further comprising an additional drive unit that is disposed parallel to the two passive links of at least one of the link portions and between the passive links and drives an additional mechanical unit attached to the movable portion, and
   the additional drive unit is attached to the drive link with a rod-like attachment portion extending along an axis of the additional drive unit and joint, the rod-like attachment portion and the joint swingably coupling the additional drive unit to the drive link around at least two mutually intersecting axes, on a straight line coupling the two passive links and a swing center point of the drive link.

2. The parallel link robot according to claim 1, wherein the joint is a universal joint.

3. The parallel link robot according to claim 1, wherein the joint is a spherical bearing, and
   the parallel link robot further comprises a detent mechanism that locks rotation of the additional drive unit around an axis parallel to the passive link.

4. The parallel link robot according to claim 3, wherein the detent mechanism includes an auxiliary link swingably attached to the additional drive unit and at least one of the passive links around an axis perpendicular to a plane containing the two passive links.

5. A parallel link robot comprising:
   a base portion;
   a movable portion;
   two or more link portions that couple the base portion and the movable portion; and
   two or more actuators that are attached to the base portion and drive respective link portions, wherein
   each of the link portions includes
      a drive link that is swung around one axis by each of the actuators, and
      two passive links parallel to each other and swingably arranged between the drive link and the movable portion,
   the parallel link robot further comprising an additional drive unit that is disposed parallel to the two passive links of at least one of the link portions and between the passive links and drives an additional mechanical unit attached to the movable portion, and
   the additional drive unit is attached to the drive link with a joint, swingably coupling the additional drive unit to the drive link around at least two mutually intersecting axes, on a straight line coupling the two passive links and a swing center point of the drive link,
   wherein the joint is a spherical bearing, and
   the parallel link robot further comprises a detent mechanism that locks rotation of the additional drive unit around an axis parallel to the passive link.

* * * * *